(12) United States Patent
Sugiyama et al.

(10) Patent No.: US 10,833,325 B2
(45) Date of Patent: Nov. 10, 2020

(54) NEGATIVE ELECTRODE ACTIVE MATERIAL

(71) Applicant: KABUSHIKI KAISHA TOYOTA JIDOSHOKKI, Kariya (JP)

(72) Inventors: Yusuke Sugiyama, Kariya (JP); Hirotaka Sone, Kariya (JP); Nobuhiro Goda, Kariya (JP); Takashi Mohri, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 190 days.

(21) Appl. No.: 15/773,672

(22) PCT Filed: Nov. 1, 2016

(86) PCT No.: PCT/JP2016/004788
§ 371 (c)(1),
(2) Date: May 4, 2018

(87) PCT Pub. No.: WO2017/081854
PCT Pub. Date: May 18, 2017

(65) Prior Publication Data
US 2018/0323427 A1    Nov. 8, 2018

(30) Foreign Application Priority Data

Nov. 9, 2015 (JP) ................ 2015-219275

(51) Int. Cl.
*H01M 4/38* (2006.01)
*H01M 4/04* (2006.01)
(Continued)

(52) U.S. Cl.
CPC ............. *H01M 4/386* (2013.01); *C01B 33/02* (2013.01); *H01M 4/0402* (2013.01);
(Continued)

(58) Field of Classification Search
CPC .................... H01M 4/366; H01M 4/4386
See application file for complete search history.

(56) References Cited

U.S. PATENT DOCUMENTS 3,684,585 A * 8/1972 Stroup ............... C23C 16/32
428/472.1
8,669,008 B2    3/2014 Cho et al.
(Continued)

FOREIGN PATENT DOCUMENTS

CN    104937753 A    9/2015
JP    2005-294079 A    10/2005
(Continued)

OTHER PUBLICATIONS

International Search Report for PCT/JP2016/004788 dated Jan. 10, 2017.
(Continued)

*Primary Examiner* — Maria Laios
(74) *Attorney, Agent, or Firm* — Sughrue Mion, PLLC

(57) ABSTRACT

A negative electrode active material is composed of a silicon material coated with a carbon layer containing a Group 4 to 6 metal.
A method for producing a negative electrode active material includes a step of decomposing a compound containing the Group 4 to 6 metal and a carbon source by heating in the presence of a silicon material, the compound, and the carbon source.

11 Claims, 2 Drawing Sheets

(51) Int. Cl.
  *H01M 4/62* (2006.01)
  *H01M 4/1395* (2010.01)
  *H01M 4/36* (2006.01)
  *H01M 4/505* (2010.01)
  *H01M 4/66* (2006.01)
  *H01M 10/0525* (2010.01)
  *H01M 10/052* (2010.01)
  *H01M 4/02* (2006.01)
  *C01B 33/02* (2006.01)

(52) U.S. Cl.
  CPC ....... *H01M 4/0471* (2013.01); *H01M 4/1395* (2013.01); *H01M 4/366* (2013.01); *H01M 4/505* (2013.01); *H01M 4/625* (2013.01); *H01M 4/626* (2013.01); *H01M 4/661* (2013.01); *H01M 10/0525* (2013.01); *H01M 10/052* (2013.01); *H01M 2004/027* (2013.01); *H01M 2004/028* (2013.01); *Y02P 20/133* (2015.11)

(56) References Cited

U.S. PATENT DOCUMENTS

| | | |
|---|---|---|
| 9,413,000 B2 | 8/2016 | Cho et al. |
| 2010/0143804 A1 | 6/2010 | Mah et al. |
| 2011/0097627 A1 | 4/2011 | Watanabe et al. |
| 2012/0077087 A1 | 3/2012 | Cho et al. |
| 2013/0130122 A1 | 5/2013 | Mah et al. |
| 2014/0110634 A1 | 4/2014 | Cho et al. |
| 2015/0044560 A1 | 2/2015 | Ogino |
| 2015/0188127 A1* | 7/2015 | Niimi ..................... C01B 33/32 429/231.95 |
| 2015/0280208 A1 | 10/2015 | Kimura et al. |
| 2015/0307362 A1 | 10/2015 | Sugiyama et al. |
| 2017/0062871 A1 | 3/2017 | Urata et al. |

FOREIGN PATENT DOCUMENTS

| | | | |
|---|---|---|---|
| JP | 2009-149462 A | 7/2009 | |
| JP | 2009149462 | * 7/2009 | ............ C01B 33/02 |
| JP | 2010-140901 A | 6/2010 | |
| JP | 2011-96455 A | 5/2011 | |
| JP | 2012-523674 A | 10/2012 | |
| JP | 2013-258032 A | 12/2013 | |
| JP | 2014-203595 A | 10/2014 | |
| JP | 2015-57767 A | 3/2015 | |
| JP | 2015-179625 A | 10/2015 | |
| JP | 2015-185509 A | 10/2015 | |
| WO | 2014/080608 A1 | 5/2014 | |
| WO | WO-2014080608 A1 * | 5/2014 | ............ H01G 11/86 |
| WO | 2015/129188 A1 | 9/2015 | |

OTHER PUBLICATIONS

Notification of Reasons for Refusal in corresponding Japanese Patent Application No. 2017-549980 received Jun. 30, 2020.
First Office Action dated Jul. 3, 2020, from the China National Intellectual Property Administration in Application No. 201680065431.3.

* cited by examiner

NEGATIVE ELECTRODE ACTIVE MATERIAL

CROSS REFERENCE TO RELATED APPLICATIONS

This application is a National Stage of International Application No. PCT/JP2016/004788 filed Nov. 1, 2016, claiming priority based on Japanese Patent Application No. 2015-219275 filed Nov. 9, 2015.

TECHNICAL FIELD

The present invention relates to a negative electrode active material.

BACKGROUND ART

Use of a silicon material containing silicon as the negative electrode active material of secondary batteries such as lithium ion secondary batteries has been known.

For example, Patent Literature 1 and Patent Literature 2 each disclose a lithium ion secondary battery including silicon as a negative electrode active material.

Patent Literature 3 and Patent Literature 4 each disclose a lithium ion secondary battery including SiO as a negative electrode active material.

Patent Literature 5 indicates that a silicon material from which hydrogen is removed was produced by: synthesizing a layered silicon compound of which the main component is layered polysilane in which Ca is removed by reacting $CaSi_2$ with an acid; and heating the layered silicon compound at 300° C. or higher, and also indicates that a lithium ion secondary battery including the silicon material as a negative electrode active material exhibits a suitable capacity retention rate.

A silicon material coated with a carbon layer has also been known to be used as a negative electrode active material in order to avoid direct contact between a silicon material containing silicon and an electrolytic solution, or in order to improve the conductivity of the silicon material containing silicon.

In fact, Patent Literature 6 discloses heating SiO and a carbon source to decompose the carbon source and coat the SiO with a carbon layer, and also discloses a lithium ion secondary battery including the SiO coated with the carbon layer as a negative electrode active material.

CITATION LIST

Patent Literature

Patent Literature 1: JP2014-203595 (A)
Patent Literature 2: JP2015-57767 (A)
Patent Literature 3: JP2015-185509 (A)
Patent Literature 4: JP2015-179625 (A)
Patent Literature 5: WO2014/080608
Patent Literature 6: JP2013-258032 (A)

SUMMARY OF INVENTION

Technical Problem

There have been increasing requirements for the performance of secondary batteries such as lithium ion secondary batteries, and particularly, providing a more excellent negative electrode active material and a method for producing the negative electrode active material has been desired.

The present invention has been made in view of these circumstances, and an object of the present invention is to provide a novel negative electrode active material and a method for producing the negative electrode active material.

Solution to Problem

Meanwhile, the carbon layer in the silicon material coated with the carbon layer is required to have sufficient strength to withstand expansion accompanying alloying of silicon and lithium during charging and discharging of a secondary battery. Here, focusing on only the carbon layer, a carbon layer produced under a heating condition of 1100° C. or higher, for example, at 2000° C., is considered to have suitable strength. However, when carbon is heated in the presence of silicon at a temperature of 1100° C. or higher, SiC is generated, and the presence of SiC is considered to decrease performance as a negative electrode active material. That is, the carbon layer coating the silicon material has a trade-off relationship between the strength and the performance as a negative electrode active material.

Therefore, in the case of producing a silicon material coated with a carbon layer, the silicon material is normally produced under a heating condition of about 600 to 1000° C. In fact, the heating condition in Patent Literature 6 is 1000° C. in Example 1, 1020° C. in Example 2, and 800° C. in Example 3.

As a result of thorough investigation conducted with many trials and errors in order to break the aforementioned trade-off relationship, the present inventors have found that a secondary battery including, as a negative electrode active material, a silicon material coated with a carbon layer containing a specific metal has an excellent capacity retention rate after charging and discharging. The active material having an excellent capacity retention rate after charging and discharging is suggested to have excellent strength. Then, the present inventors have accomplished the present invention on the basis of this finding.

Specifically, a negative electrode active material of the present invention is composed of a silicon material coated with a carbon layer containing a Group 4 to 6 metal.

Advantageous Effects of Invention

The negative electrode active material of the present invention serves as an excellent negative electrode active material.

DESCRIPTION OF EMBODIMENTS

Figure 1:
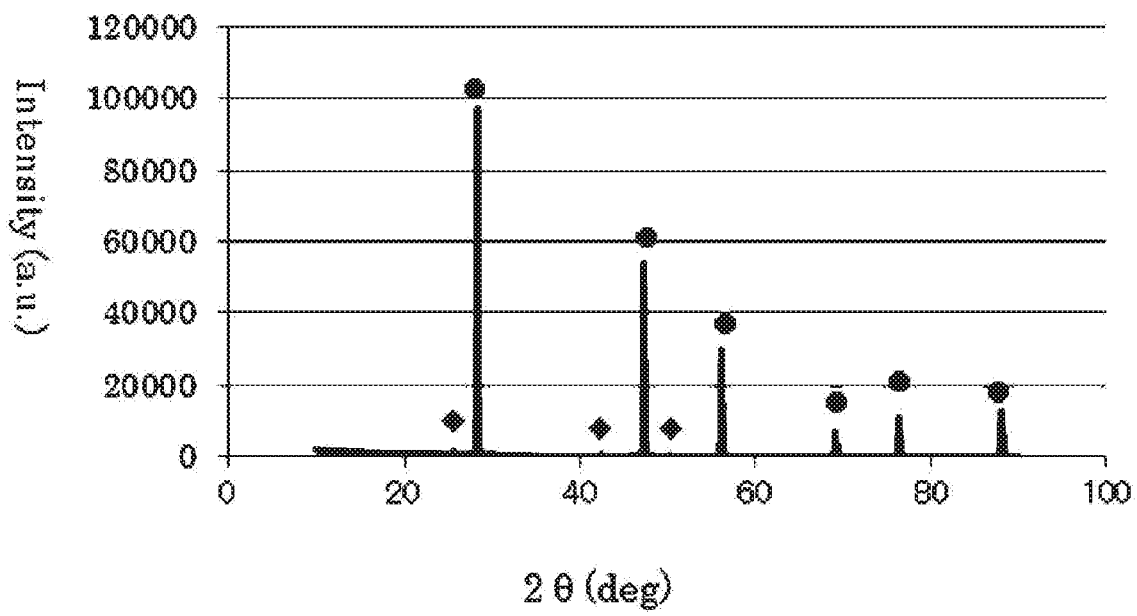
FIG. 1 is an X-ray diffraction chart of a negative electrode active material of Example 1.

The following describes the best mode for carrying out the present invention. Unless otherwise mentioned in particular, a numerical value range of "x to y" described in the present specification includes, in the range thereof, a lower limit "x" and an upper limit "y". A numerical value range may be formed by arbitrarily combining such upper limit values, lower limit values, and numerical values described in Examples. In addition, numerical values arbitrarily selected within a numerical value range may be used as upper limit and lower limit numerical values.

The negative electrode active material of the present invention is composed of a silicon material coated with a carbon layer containing a Group 4 to 6 metal. In other words, the negative electrode active material of the present invention includes the silicon material as a core portion and the carbon layer containing the Group 4 to 6 metal as a surface portion.

The silicon material is a material containing silicon, and may be any material that serves as an active material of a secondary battery. Examples of a specific silicon material include elemental substance silicon, $SiO_x$ (0.3×1.6), and the silicon material disclosed in Patent Literature 5. The silicon material may contain impurities such as oxygen, alkali metals, and alkaline earth metals.

The silicon material disclosed in Patent Literature 5 is described in detail. The silicon material is produced by a method in which a layered silicon compound of which the main component is layered polysilane is synthesized by reacting $CaSi_2$ with an acid and further, hydrogen is removed by heating the layered silicon compound at 300° C. or higher. The silicon material has a structure made up of a plurality of plate-like silicon bodies laminated in the thickness direction. This structure is confirmed by observation with a scanning electron microscope or the like. For efficient insertion and elimination reaction of lithium ion, each plate-like silicon body has a thickness preferably in a range of 10 nm to 100 nm and more preferably in a range of 20 nm to 50 nm. The plate-like silicon body has a length in the longitudinal direction preferably in a range of 0.1 μm to 50 μm. Regarding the plate-like silicon body, (length in the longitudinal direction)/(thickness) preferably falls in a range of 2 to 1000.

The method for producing the silicon material disclosed in Patent Literature 5 is represented by the following ideal reaction formula. Hydrogen chloride is used as the acid.

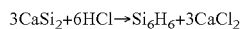

3CaSi$_2$+6HCl→Si$_6$H$_6$+3CaCl$_2$

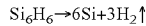

Si$_6$H$_6$→6Si+3H$_2$↑

The silicon material preferably contains amorphous silicon and/or silicon crystallites. The size of the silicon crystallites is preferably within a range of 0.5 nm to 300 nm, more preferably within a range of 1 nm to 100 nm, further preferably within a range of 1 nm to 50 nm, and particularly preferably within a range 1 nm to 10 nm. The size of the silicon crystallites is calculated in accordance with Scherrer's equation by using the half width of a diffraction peak of the Si (111) plane in an X-ray diffraction chart obtained from an X-ray diffraction measurement conducted on the silicon material.

In the negative electrode active material of the present invention, silicon is preferably present in 50 to 99 mass %, more preferably present in 60 to 97 mass %, and further preferably present in 70 to 95 mass %.

In the negative electrode active material of the present invention, the carbon layer preferably coats the entire surface of the silicon material. In the negative electrode active material of the present invention, carbon is preferably present in 0.5 to 10 mass %, more preferably present in 1 to 8 mass %, and further preferably present in 2 to 6 mass %.

The carbon layer has a thickness of preferably 1 to 100 nm and more preferably 5 to 50 nm.

When the carbon layer is analyzed by Raman spectrometry, a carbon-derived peak called G-band is observed around 1590 cm$^{-1}$, and a carbon-derived peak called D-band is further observed around 1350 cm$^{-1}$. The G-band is considered to be derived from graphite, and the D-band is considered to be derived from carbon with a dangling bond or the like. In the negative electrode active material of the present invention, the value of (D-band peak intensity)/(G-band peak intensity) (hereinafter, referred to as D/G ratio) is observed in a range of 0.80 to 1 in some cases.

In the negative electrode active material of the present invention, the Group 4 to 6 metal is considered to be bound to carbon, and this bond is considered as a covalent bond and/or a coordinate bond. The strength of the carbon layer in the negative electrode active material of the present invention is speculated to be increased due to this bond.

The Group 4 to 6 metal is preferably present in 0.01 to 10 mole %, more preferably present in 0.1 to 7 mole %, and further preferably present in 1 to 5 mole %, with respect to the number of moles of carbon element present in the carbon layer.

Here, the Group 4 to 6 metal is known to be bound to carbon to form a carbide. For example, WO2012/018082 indicates that Mo$_2$C was generated when heating was performed at 280° C. in the presence of n-hexadecyl amine, n-octyl ether, and hexacarbonylmolybdenum. In view of a heating temperature in a later-described method for producing the negative electrode active material of the present invention, a carbide obtained by binding the Group 4 to 6 metal with carbon is considered to be formed also in the negative electrode active material of the present invention in some cases.

The carbide obtained by binding the Group 4 to 6 metal with carbon is relatively stable to heat, oxidation, or the like, or to contact with a solvent, and also exhibits a certain level of conductivity. Therefore, in the negative electrode active material of the present invention, the presence of the carbide obtained by binding the Group 4 to 6 metal with carbon is considered as a factor for the suitable function of the negative electrode active material of the present invention.

Table 1 shows carbides obtained by binding Group 4 to 6 metals with carbon, and electrical resistivity thereof. The reciprocal of the electrical resistivity is electrical conductivity.

TABLE 1

| Carbide | Electrical resistivity |
|---------|------------------------|
| WC      | 19 μΩ · cm (20° C.)    |
| Mo$_2$C | 71 μΩ · cm (20° C.)    |
| TiC     | 61 μΩ · cm (20° C.)    |
| TaC     | 22 μΩ · cm (20° C.)    |
| NbC     | 44 μΩ · cm (20° C.)    |
| VC      | 78 μΩ · cm (25° C.)    |
| ZrC     | 49 μΩ · cm (25° C.)    |

In the negative electrode active material of the present invention, the Group 4 to 6 metal may be one type or may be a plurality of types. Ti, Zr, V, Nb, Ta, Cr, Mo, and W are preferable as the Group 4 to 6 metal.

In the negative electrode active material of the present invention, the Group 4 to 6 metal is preferably present in 0.001 to 1 mass %, more preferably present in 0.005 to 0.5 mass %, and further preferably present in 0.01 to 0.3 mass %. If the amount of the Group 4 to 6 metal is excessively large, the electrical conductivity of the negative electrode active material of the present invention increases, but the Group 4 to 6 metal becoming resistance to lithium ion diffusion in a lithium ion secondary battery including the negative electrode active material of the present invention becomes a concern.

The electrical resistivity of the negative electrode active material of the present invention is preferably within a range of 0.1 to 3.0 Ω·cm, more preferably within a range of 0.2 to 2.5 Ω·cm, and further preferably within a range of 0.3 to 1.0 Ω·cm.

Regarding the particle size distribution of the negative electrode active material of the present invention, the mean particle size of the negative electrode active material is preferably within a range of 0.5 to 30 μm and more preferably within a range of 1 to 10 μm. The mean particle size refers to D50 that is measured by a general laser diffraction type particle-size-distribution measuring device.

In the following, the method for producing the negative electrode active material of the present invention is described.

The method for producing the negative electrode active material of the present invention includes a step (hereinafter, sometimes referred to as "step of the present invention") of decomposing a compound containing the Group 4 to 6 metal and a carbon source by heating in the presence of the silicon material, the compound, and the carbon source.

The step of the present invention is inferred to proceed through the following mechanism.

1. The carbon source is decomposed to generate a tarry substance.
2. A metal generated by decomposing the compound containing the Group 4 to 6 metal is taken into the tarry substance.
3. The tarry substance containing the metal adheres to the surface of the silicon material.
4. The tarry substance described in 3. is carbonized to form a carbon layer, whereby a silicon material coated with the carbon layer containing the Group 4 to 6 metal is obtained.

Since the negative electrode active material of the present invention is considered to be produced through the above mechanism, the Group 4 to 6 metal contained in the negative electrode active material of the present invention is considered to be dispersedly present in the carbon layer.

From the viewpoint of avoiding generation of SiC, the heating temperature in the step of the present invention is preferably 600 to 1000° C., more preferably 700 to 1000° C., and further preferably 800 to 1000° C. The heating time may be determined as appropriate in accordance with the scale of production.

The compound containing the Group 4 to 6 metal is preferably a compound that is decomposed by heating at 600 to 1000° C. Examples of the compound containing the Group 4 to 6 metal include a complex of the Group 4 to 6 metal and a ligand such as carbonyl and cyclopentadienyl, a salt containing the Group 4 to 6 metal, and hydrates thereof.

Examples of a specific compound containing the Group 4 to metal include titanium potassium oxalate, tetrakis(ethylmethylamino)titanium, tetrakis(dimethylamino)titanium, tetramethoxytitanium, tetraethoxytitanium, tetra-n-propoxytitanium, tetraisopropoxytitanium, tetrabutoxytitanium, titanium tetrakis(2-ethyl-1-hexanolato), bis(cyclopentadienyl)dichlorotitanium, cyclopentadienyltribenzyltitanium, zirconium acetylacetonato, tetramethoxyzirconium, tetraethoxyzirconium, tetra-n-propoxyzirconium, tetraisopropoxyzirconium, tetrabutoxyzirconium, tetrakis(ethylmethylamino)zirconium, tetrakis(dimethylamino)zirconium, dichlorobis(cyclopentadienyl)zirconium, bis(cyclopentadienyl)dimethylzirconium, methyltris(cyclopentadienyl)zirconium, bis(cyclopentadienyl)dibutylzirconium, bis(cyclopentadienyl)dichlorovanadium, vanadium (III) acetylacetonato, bis(cyclopentadienyl) niobium dichloride, tetrachloro(2,3,4,5-tetramethyl-2,4-cyclopentadienyl)niobium, niobium (V) pentaethoxide, penta-n-propoxyniobium (V), pentaisopropoxyniobium (V), pentabutoxyniobium (V), pentaphenoxyniobium (V), pentamethoxytantalum (V), pentaethoxytantalum (V), pentakis (dimethylamino)tantalum, tetrachloro(2,3,4,5-tetramethyl-2,4-cyclopentadienyl)tantalum, chromium (III) triacetate, chromium (III) acetylacetonato, hexacarbonylmolybdenum, molybdenum nitride, a dicarbonylcyclopentadienylmolybdenum dimer, a tricarbonylcyclopentadienylmolybdenum dimer, bipyridyltetracarbonylmolybdenum, molybdenum naphthenate, molybdenum octanoate, hexacarbonyltungsten, tungsten nitride, bis(isopropylcyclopentadienyl)tungsten (IV) dihydride, and bis(cyclopentadienyl)tungsten (IV) dihydride.

The carbon source may be any source that is decomposable by the heating in the step of the present invention to supply carbon. Specific examples of the carbon source include: saturated hydrocarbons such as methane, ethane, propane, butane, pentane, and hexane; unsaturated hydrocarbons such as ethylene, propylene, and acetylene; alcohols such as methanol, ethanol, propanol, and butanol; esters such as ethyl acetate, butyl acetate, and amyl acetate; aromatic compounds such as benzene, toluene, xylene, styrene, ethylbenzene, diphenylmethane, naphthalene, phenol, cresol, benzoic acid, salicylic acid, nitrobenzene, chlorobenzene, indene, furan, benzofuran, pyrrole, pyridine, indole, anthracene, and phenanthrene; and various types of resins. As the carbon source, the above substances may be used individually, or a plurality of the above substances may be used in combination.

When the compound containing the Group 4 to 6 metal contains a large amount of carbon, the compound may also serve as a carbon source.

After the step of the present invention, a grinding step of grinding the silicon material coated with the carbon layer containing the Group 4 to 6 metal, a washing step of washing with a polar solvent such as water, and a drying step and/or a sizing step may be performed.

The negative electrode active material of the present invention may be used as the negative electrode active material of secondary batteries such as lithium ion secondary batteries.

The lithium ion secondary battery of the present invention includes the negative electrode active material of the present invention. Specifically, the lithium ion secondary battery of the present invention includes a positive electrode, a negative electrode including the negative electrode active material of the present invention, an electrolytic solution, and a separator.

The positive electrode includes a current collector and a positive electrode active material layer bound to the surface of the current collector.

The current collector refers to an electron conductor that is chemically inert for continuously sending a flow of current to the electrode during discharging or charging of the lithium ion secondary battery. Examples of the current collector include at least one element selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, its thickness is preferably within a range of 1 µm to 100 µm.

The positive electrode active material layer includes a positive electrode active material, and, if necessary, a conductive additive and/or a binding agent.

Examples of the positive electrode active material include layer compounds that are $Li_aNi_bCo_cMn_dD_eO_f$ ($0.2 \leq a \leq 2$; $b+c+d+e=1$; $0 \leq e<1$; D is at least one element selected from Li, Fe, Cr, Cu, Zn, Ca, Mg, S, Si, Na, K, Al, Zr, Ti, P, Ga, Ge, V, Mo, Nb, W, or La; 1.73) and $Li_2MnO_3$. Additional examples of the positive electrode active material include spinel such as $LiMn_2O_4$, a solid solution formed from a mixture of spinel and a layer compound, and polyanion based compounds such as $LiMPO_4$, $LiMVO_4$, or $Li_2MSiO_4$ (wherein, "M" is selected from at least one of Co, Ni, Mn, or Fe). Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of each composition formula described above, and those in which a metal element included in the basic composition is substituted with another metal element may also be used as the positive electrode active material. In addition, as the positive electrode active material, a raw material for the positive electrode active material not including a lithium ion contributing to the charging and discharging may be used, such as, for example, elemental substance sulfur, a compound that is a composite of sulfur and carbon, metal sulfides such as $TiS_2$, oxides such as $V_2O_5$ and $MnO_2$, polyaniline and anthraquinone and compounds including such aromatics in the chemical structure, conjugate based materials such as conjugate diacetic acid based organic matters, and other materials known in the art. Furthermore, a compound having a stable radical such as nitroxide, nitronyl nitroxide, galvinoxyl, and phenoxyl may be used as the positive electrode active material. When a material for the positive electrode active material not containing lithium is to be used, an ion has to be added in advance to the positive electrode and/or the negative electrode using a method known in the art. For the purpose of adding the ion, a metal or a compound including the ion may be used.

The conductive additive is added for increasing the conductivity of the electrode. Thus, the conductive additive is preferably added optionally when the conductivity of the electrode is insufficient, and may not be added when the conductivity of the electrode is sufficiently good. The conductive additive may be a chemically inert fine electron conductor, and examples of the conductive additive include carbonaceous fine particles such as carbon black, graphite, vapor grown carbon fiber (VGCF) and various metal particles. Examples of carbon black include acetylene black, Ketchen black (registered trademark), furnace black, and channel black. These conductive additives may be individually added to the active material layer, or a combination of two or more of these conductive additives may be added to the active material layer.

The blending ratio of the conductive additive in the active material layer in mass ratio, that is, active material:conductive additive, is preferably 1:0.005 to 1:0.5, more preferably 1:0.01 to 1:0.2, and further preferably 1:0.03 to 1:0.1. The reason is that if the conductive additive is too little, efficient conducting paths are not formed, whereas if the conductive additive is too much, the moldability of the active material layer deteriorates and the energy density of the electrode becomes lower.

The binding agent serves to adhere the active material or the conductive additive to the surface of the current collector and maintain the conductive network in the electrode. Examples of the binding agent include fluorine-containing resins such as polyvinylidene fluoride, polytetrafluoroethylene, and fluororubber, thermoplastic resins such as polypropylene and polyethylene, imide-based resins such as polyimide and polyamide-imide, alkoxysilyl group-containing resins, acrylic resins such as poly(meth)acrylic acid, styrene-butadiene rubber (SBR), carboxymethyl cellulose, alginates such as sodium alginate and ammonium alginate, a water-soluble cellulose ester crosslinked product, and starch-acrylic acid graft polymer. These binding agents may be used individually or in plurality.

The blending ratio of the binding agent in the active material layer in mass ratio, that is, active material:binding agent, is preferably 1:0.001 to 1:0.3, more preferably 1:0.005 to 1:0.2, and further preferably 1:0.01 to 1:0.15. The reason is that if the binding agent is too little, the moldability of the electrode deteriorates, whereas if the binding agent is too much, the energy density of the electrode becomes lower.

The negative electrode includes a current collector and a negative electrode active material layer bound to the surface of the current collector. Regarding the current collector, those described for the positive electrode may be appropriately and suitably used. The negative electrode active material layer includes a negative electrode active material, and, if necessary, a conductive additive and/or a binding agent.

As the negative electrode active material, the negative electrode active material of the present invention may be used, only the negative electrode active material of the present invention may be used, or the negative electrode active material of the present invention and a known negative electrode active material may be used in combination.

Regarding the conductive additive and the binding agent to be used in the negative electrode, those described for the positive electrode may be appropriately and suitably used in the same blending ratio as described above.

In order to form the active material layer on the surface of the current collector, the active material may be applied to the surface of the current collector using a known conventional method such as a roll coating method, a die coating method, a dip coating method, a doctor blade method, a spray coating method, and a curtain coating method. Specifically, an active material, a solvent, and if necessary, a binding agent and/or a conductive additive are mixed to prepare a slurry. Examples of the solvent include N-methyl-2-pyrrolidone, methanol, methyl isobutyl ketone, and water. The slurry is applied to the surface of the current collector, and then dried. In order to increase the electrode density, compression may be performed after drying.

The electrolytic solution contains a nonaqueous solvent and an electrolyte dissolved in the nonaqueous solvent.

As the nonaqueous solvent, cyclic esters, linear esters, and ethers may be used. Examples of the cyclic esters include ethylene carbonate, propylene carbonate, butylene carbonate, gamma butyrolactone, vinylene carbonate, 2-methyl-gamma butyrolactone, acetyl-gamma butyrolactone, and gamma valerolactone. Examples of the linear esters include dimethyl carbonate, diethyl carbonate, dibutyl carbonate, dipropyl carbonate, ethyl methyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As the nonaqueous solvent, compounds in which part or all of hydrogens in the chemical structure of the specific solvents are substituted by fluorine may be used.

Examples of the electrolyte include lithium salts such as $LiClO_4$, $LiAsF_6$, $LiPF_6$, $LiBF_4$, $LiCF_3SO_3$, $LiN(SO_2F)_2$, and $LiN(CF_3SO_2)_2$.

Examples of the electrolytic solution include solutions prepared by dissolving a lithium salt such as $LiClO_4$, $LiPF_6$, $LiBF_4$, $LiCF_3SO_3$, or $LiN(SO_2F)_2$ in a nonaqueous solvent such as ethylene carbonate, dimethyl carbonate, propylene carbonate, or diethyl carbonate in a concentration of about 0.5 mol/L to 3.0 mol/L.

The separator allows lithium ions to pass therethrough while separating the positive electrode and the negative electrode to prevent short circuiting due to contact between both electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

Next, a method for producing a lithium ion secondary battery is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly. In addition, the lithium ion secondary battery of the present invention preferably executes charging and discharging in a voltage range suitable for the types of active materials contained in the electrodes.

The form of the lithium ion secondary battery of the present invention is not limited in particular, and various forms such as a cylindrical type, a square type, a coin type, a laminated type, etc., are used.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is specifically described by presenting Examples, Comparative Examples, etc. The present invention is not limited to these Examples.

Example 1

A negative electrode active material and a lithium ion secondary battery of Example 1 were produced as described below.

Fifteen grams of silicon having a mean particle size of 3 μm (Kojundo Chemical Laboratory Co., Ltd.) and 38 mg of hexacarbonylmolybdenum (Kojundo Chemical Laboratory Co., Ltd.) were placed into a rotary kiln type reactor, and thermal CVD was conducted thereon under a flow of propane gas under conditions of 880° C. and a retention time of 5 minutes to obtain a silicon material coated with a carbon layer containing molybdenum. The furnace core tube of the reactor was arranged horizontally. The rotational speed of the furnace core tube was set to 1 rpm. A baffle plate was arranged on the inner circumference wall of the furnace core tube, and was configured such that a content deposited on the baffle plate falls off the baffle plate from a predetermined height associated with rotation, and the content was stirred because of the configuration. Under the above conditions, 15 g of silicon was coated with about 750 mg of carbon.

The silicon material coated with the carbon layer containing molybdenum was washed with water and dried to obtain the negative electrode active material of Example 1.

A slurry was prepared by mixing 85 parts by mass of the negative electrode active material of Example 1, 10 parts by mass of polyamide-imide as a binding agent, 5 parts by mass of acetylene black as a conductive additive, and an adequate amount of N-methyl-2-pyrrolidone.

As a current collector, an electrolytic copper foil having a thickness of 30 μm was prepared. The above slurry was applied to the surface of the copper foil in a film form using a doctor blade. The copper foil to which the slurry had been applied was dried at 80° C. for 20 minutes to remove N-methyl-2-pyrrolidone by volatilization. As a result, a copper foil having a negative electrode active material layer formed on the surface of the foil was obtained. The copper foil was then pressed using a roll press machine such that the thickness of the negative electrode active material layer was 20 μm, to obtain a joined object. The joined object was heated and dried under reduced pressure at 180° C. for 2 hours to obtain a negative electrode.

The negative electrode was cut so as to have a diameter of 11 mm to obtain an evaluation electrode. A metal lithium foil having a thickness of 500 μm was cut so as to have a diameter of 13 mm to obtain a counter electrode. As a separator, a glass filter (Hoechst Celanese Corporation) and Celgard 2400 (Polypore Inc.), which is a monolayer polypropylene, were prepared. In a solvent prepared by mixing 50 parts by volume of ethylene carbonate and 50 parts by volume of diethyl carbonate, $LiPF_6$ was dissolved in 1 mol/L to prepare an electrolytic solution. The two types of separators were interposed between the counter electrode and the evaluation electrode in the sequence of the counter electrode, the glass filter, Celgard 2400, and the evaluation electrode, to obtain an electrode assembly. The electrode assembly was housed in a coin type battery case CR2032 (Hohsen Corp.), and further the electrolytic solution was injected thereinto to obtain a coin type battery. This battery was used as the lithium ion secondary battery of Example 1.

Example 2

A negative electrode active material composed of a silicon material coated with a carbon layer containing molybdenum and a lithium ion secondary battery of Example 2 were produced using a method similar to that in Example 1 except for using 76 mg of hexacarbonylmolybdenum.

Example 3

A negative electrode active material composed of a silicon material coated with a carbon layer containing molybdenum and a lithium ion secondary battery of Example 3 were produced using a method similar to that in Example 1 except for using 38 mg of molybdenum nitride (Kojundo Chemical Laboratory Co., Ltd.) instead of 38 mg of hexacarbonylmolybdenum.

Example 4

A negative electrode active material composed of a silicon material coated with a carbon layer containing titanium and a lithium ion secondary battery of Example 4 were produced using a method similar to that in Example 1 except for using 38 mg of titanium potassium oxalate dihydrate (Kojundo Chemical Laboratory Co., Ltd.) instead of 38 mg of hexacarbonylmolybdenum.

Example 5

A negative electrode active material composed of a silicon material coated with a carbon layer containing tantalum and a lithium ion secondary battery of Example 5 were produced using a method similar to that in Example 1 except for using 1.05 g of pentamethoxytantalum (V) instead of 38 mg of hexacarbonylmolybdenum.

Example 6

A negative electrode active material composed of a silicon material coated with a carbon layer containing tungsten and a lithium ion secondary battery of Example 6 were produced using a method similar to that in Example 1 except for using 1.10 g of hexacarbonyltungsten instead of 38 mg of hexacarbonylmolybdenum.

Example 7

A negative electrode active material composed of a silicon material coated with a carbon layer containing chromium and a lithium ion secondary battery of Example 7 were produced using a method similar to that in Example 1 except for using 0.77 g of chromium (III) triacetate instead of 38 mg of hexacarbonylmolybdenum.

Example 8

A negative electrode active material composed of a silicon material coated with a carbon layer containing zirconium and a lithium ion secondary battery of Example 8 were produced using a method similar to that in Example 1 except for using 0.85 g of tetraethoxyzirconium instead of 38 mg of hexacarbonylmolybdenum.

Example 9

A negative electrode active material composed of a silicon material coated with a carbon layer containing niobium and a lithium ion secondary battery of Example 9 were produced using a method similar to that in Example 1 except for using 0.99 g of niobium (V) pentaethoxide instead of 38 mg of hexacarbonylmolybdenum.

Example 10

A negative electrode active material composed of a silicon material coated with a carbon layer containing vanadium and a lithium ion secondary battery of Example 10 were produced using a method similar to that in Example 1 except for using 0.79 g of bis(cyclopentadienyl)dichlorovanadium instead of 38 mg of hexacarbonylmolybdenum.

Comparative Example 1

A negative electrode active material composed of a silicon material coated with a carbon layer and a lithium ion secondary battery of Comparative Example 1 were produced using a method similar to that in Example 1 except for not using hexacarbonylmolybdenum.

Example 11

In an argon gas atmosphere, 5 g of $CaSi_2$ was added to a 100 mL of a 35 mass % HCl aqueous solution in an ice bath, and the mixture was stirred for 90 minutes. Dispersion of dark green powder in the reaction liquid was observed. The reaction liquid was filtered, and the residue was washed with distilled water and acetone, and further dried under reduced pressure at room temperature for 12 hours to obtain a layered silicon compound containing polysilane.

The layered silicon compound was heated in an argon gas atmosphere at 900° C. for 1 hour to produce a silicon material. The silicon material was ground, passed through a sieve having an opening of 25 μm, and then used in the following production.

A negative electrode active material composed of a silicon material coated with a carbon layer containing molybdenum and a lithium ion secondary battery of Example 11 were produced using a method similar to that in Example 3 except for using the above silicon material instead of silicon having a mean particle size of 3 μm (Kojundo Chemical Laboratory Co., Ltd.).

Example 12

A negative electrode active material composed of a silicon material coated with a carbon layer containing tantalum and a lithium ion secondary battery of Example 12 were produced using a method similar to that in Example 5 except for using a silicon material produced using the same method as in Example 11, instead of silicon having a mean particle size of 3 μm (Kojundo Chemical Laboratory Co., Ltd.).

Example 13

A negative electrode active material composed of a silicon material coated with a carbon layer containing tungsten and a lithium ion secondary battery of Example 13 were produced using a method similar to that in Example 6 except for using a silicon material produced using the same method as in Example 11, instead of silicon having a mean particle size of 3 μm (Kojundo Chemical Laboratory Co., Ltd.).

Example 14

A negative electrode active material composed of a silicon material coated with a carbon layer containing chromium and a lithium ion secondary battery of Example 14 were produced using a method similar to that in Example 7 except for using a silicon material produced using the same method as in Example 11, instead of silicon having a mean particle size of 3 μm (Kojundo Chemical Laboratory Co., Ltd.).

Example 15

A negative electrode active material composed of a silicon material coated with a carbon layer containing zirconium and a lithium ion secondary battery of Example 15 were produced using a method similar to that in Example 8 except for using a silicon material produced using the same method as in Example 11, instead of silicon having a mean particle size of 3 μm (Kojundo Chemical Laboratory Co., Ltd.).

Example 16

A negative electrode active material composed of a silicon material coated with a carbon layer containing niobium and a lithium ion secondary battery of Example 16 were produced using a method similar to that in Example 9 except for using a silicon material produced using the same method as in Example 11, instead of silicon having a mean particle size of 3 μm (Kojundo Chemical Laboratory Co., Ltd.).

Example 17

A negative electrode active material composed of a silicon material coated with a carbon layer containing vanadium and a lithium ion secondary battery of Example 17 were produced using a method similar to that in Example 10 except for using a silicon material produced using the same method as in Example 11, instead of silicon having a mean particle size of 3 μm (Kojundo Chemical Laboratory Co., Ltd.).

Comparative Example 2

A negative electrode active material composed of a silicon material coated with a carbon layer and a lithium ion secondary battery of Comparative Example 2 were produced using a method similar to that in Example 11 except for not using molybdenum nitride.

Evaluation Example 1

The negative electrode active materials of Examples 1 to 10 and Comparative Example 1 were formed into pellets, and measured for electrical resistance by a four-terminal measurement method. The results are shown in Table 2.

TABLE 2

|  | Group 4 to 6 metal | Electrical resistance (Ω · cm) |
| --- | --- | --- |
| Example 1 | Mo | 0.6532 |
| Example 2 | Mo | 0.5922 |
| Example 3 | Mo | 0.4467 |
| Example 4 | Ti | 0.3346 |
| Example 5 | Ta | 0.3921 |
| Example 6 | W | 0.3403 |
| Example 7 | Cr | 0.8020 |
| Example 8 | Zr | 0.7324 |
| Example 9 | Nb | 0.4563 |
| Example 10 | V | 0.5261 |
| Comparative Example 1 | — | 1.345 |

From Table 2, the electrical resistance of the negative electrode active material is found to decrease due to the Group 4 to 6 metal being contained in the carbon layer.

The same evaluation as described above was made for the negative electrode active materials of Example 11 and Comparative Example 2 in which the silicon material to be coated with carbon was changed from that in the respective negative electrode active materials of Example 3 and Comparative Example 1. The results are shown in Table 3.

TABLE 3

|  | Group 4 to 6 metal | Electrical resistance (Ω · cm) |
| --- | --- | --- |
| Example 11 | Mo | 2.2577 |
| Comparative Example 2 | — | 6.2113 |

From Table 3, also in the negative electrode active material in which the silicon material to be coated with carbon was changed, the phenomenon that the electrical resistance of the negative electrode active material decreases due to the Group 4 to 6 metal being contained in the carbon layer was confirmed.

Evaluation Example 2

With respect to the respective negative electrode active materials of Examples 1 to 4 and 11 and Comparative Examples 1 and 2, high-frequency inductively-coupled plasma emission spectrometry was performed to measure the amounts of the elements contained in each negative electrode active material. The results are shown in Table 4. The unit of the values in Table 4 is mass %.

TABLE 4

|  | Si | Mo | Ti | K | C |
| --- | --- | --- | --- | --- | --- |
| Example 1 | 89.1 | 0.025 | — | — | 3.75 |
| Example 2 | 89.9 | 0.04 | — | — | 3.35 |

TABLE 4-continued

|  | Si | Mo | Ti | K | C |
|---|---|---|---|---|---|
| Example 3 | 90.5 | 0.25 | — | — | 3.56 |
| Example 4 | 89.3 | — | 0.026 | 0.001 | 3.93 |
| Example 11 | 81.1 | 0.022 | — | — | 4.69 |
| Comparative Example 1 | 90.4 | — | — | — | 3.68 |
| Comparative Example 2 | 81.7 | — | — | — | 4.75 |

The Group 4 to 6 metal was confirmed to be contained in the negative electrode active material of the present invention. Regarding the amount of potassium in the negative electrode active material of Example 4, since potassium easily scatters due to heating and is also easily removed by washing with water, the amount of potassium in the negative electrode active material of Example 4 is considered to have become low.

Evaluation Example 3

With respect to the respective negative electrode active materials of Examples 1, 3, and 4 and Comparative Example 1, Raman spectroscopic analysis was performed. In each of the obtained Raman spectra, a peak called G-band was observed around 1590 cm$^{-1}$, and a peak called D-band was observed around 1350 cm$^{-1}$. A D/G ratio was calculated, and the results are shown in Table 5.

TABLE 5

|  | D/G ratio |
|---|---|
| Example 1 | 0.94 |
| Example 3 | 0.89 |
| Example 4 | 0.94 |
| Comparative Example 1 | 0.78 |

Due to the Group 4 to 6 metal being contained, the proportion of the D-band is considered to increase, and the proportion of the G-band is considered to decrease. In the negative electrode active material of the present invention, since carbon is bound to the Group 4 to 6 metal, the proportion of the G-band derived from graphite, which has a stable structure with carbon only, is considered to have decreased.

Evaluation Example 4

Figure 2:
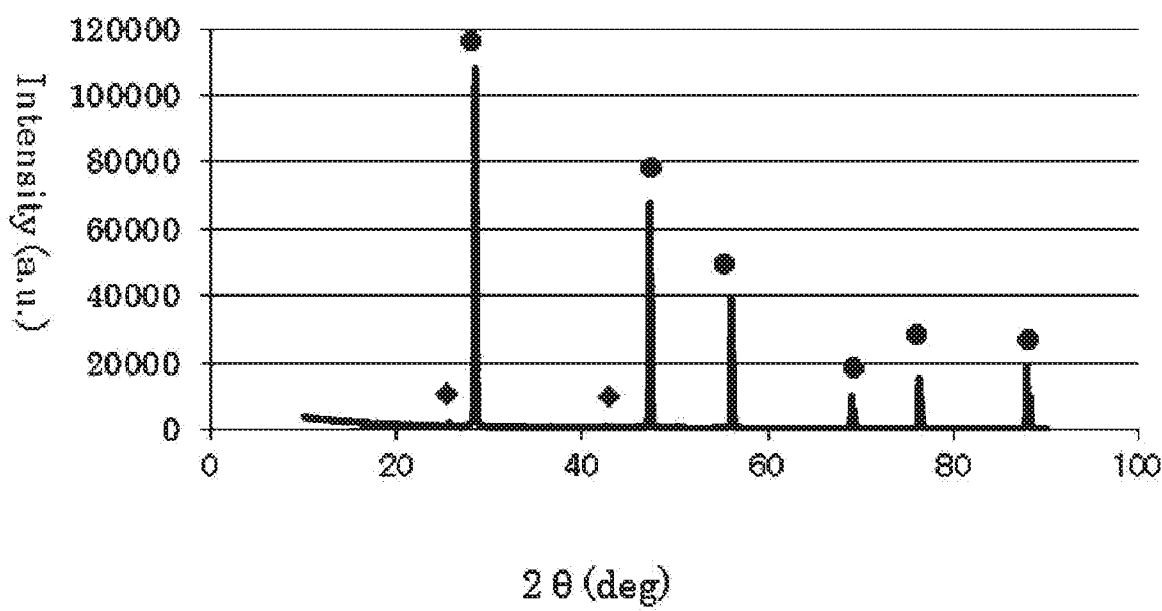
FIG. 2 is an X-ray diffraction chart of a negative electrode active material of Example 4.
Figure 3:
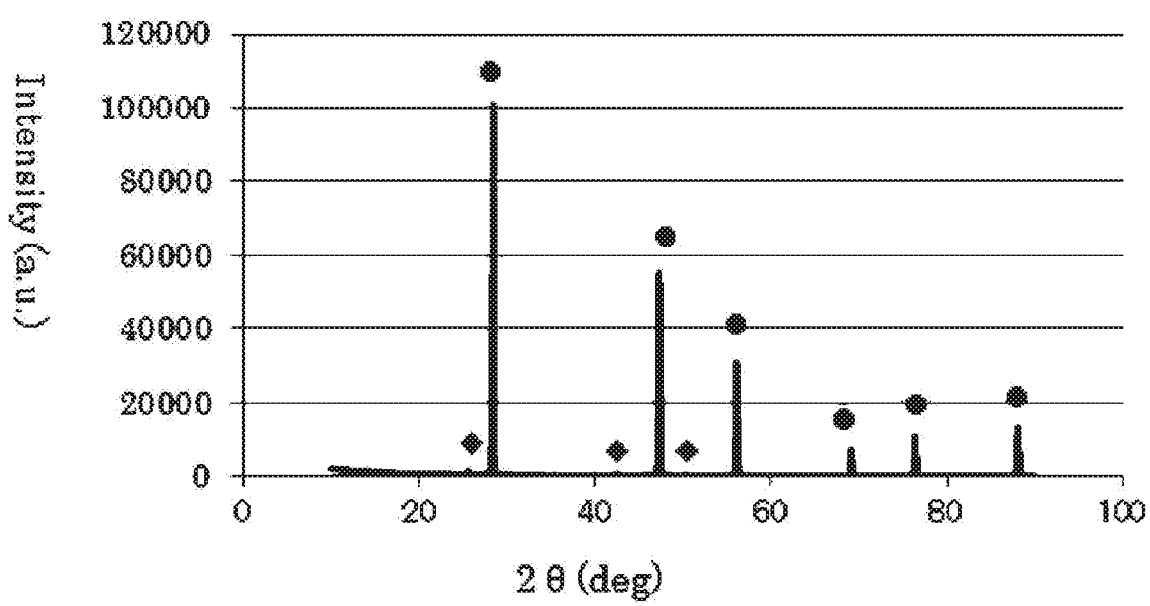
FIG. 3 is an X-ray diffraction chart of a negative electrode active material of Comparative Example 1.

X-ray diffraction of the respective negative electrode active materials of Examples 1, 3, and 4 and Comparative Example 1 was measured with a powder X-ray diffractometer. From the X-ray diffraction chart of each of the negative electrode active materials of Examples 1, 3, and 4 and Comparative Example 1, peaks derived from silicon crystal and carbon crystal were observed, but no peak derived from Group 4 to 6 metal crystal was observed. FIG. 1 shows the X-ray diffraction chart of the negative electrode active material of Example 1, FIG. 2 shows the X-ray diffraction chart of the negative electrode active material of Example 4, and FIG. 3 shows the X-ray diffraction chart of the negative electrode active material of Comparative Example 1. In each chart, ● indicates the peaks derived from silicon crystal, and ♦ indicates the peaks derived from carbon crystal.

Evaluation Example 5

With respect to the respective lithium ion secondary batteries of Examples 1 to 17 and Comparative Examples 1 and 2, a charging and discharging cycle of discharging with a current of 0.2 mA until the voltage of the evaluation electrode with respect to the counter electrode reached 0.0085 V and then charging with a current of 0.2 mA until the voltage of the evaluation electrode with respect to the counter electrode reached 1.2 V, was performed by 20 cycles. In Evaluation Example 5, occluding Li to the evaluation electrode is referred to as discharging, and releasing Li from the evaluation electrode is referred to as charging. The ratio of a charge capacity after 20 cycles to a first charge capacity was calculated as a capacity retention rate. In addition, the ratio of an initial charge capacity to an initial discharge capacity was calculated as initial efficiency. The results are shown together with the values of the initial charge capacity in Table 6.

TABLE 6

|  | Capacity retention rate (%) | Initial efficiency (%) | Initial charge capacity (mAh/g) |
|---|---|---|---|
| Example 1 | 94.3 | 86.2 | 1605 |
| Example 2 | 93.3 | 81.7 | 1222 |
| Example 3 | 94.1 | 86.9 | 1634 |
| Example 4 | 94.0 | 87.1 | 1651 |
| Example 5 | 92.5 | 85.9 | 1625 |
| Example 6 | 93.3 | 86.1 | 1687 |
| Example 7 | 94.2 | 85.0 | 1616 |
| Example 8 | 93.8 | 86.3 | 1647 |
| Example 9 | 94.3 | 85.4 | 1608 |
| Example 10 | 93.6 | 87.1 | 1622 |
| Comparative Example 1 | 92.1 | 84.4 | 1611 |
| Example 11 | 97.2 | 78.8 | 1290 |
| Example 12 | 97.3 | 78.1 | 1231 |
| Example 13 | 97.0 | 79.3 | 1284 |
| Example 14 | 96.9 | 78.6 | 1269 |
| Example 15 | 97.8 | 79.9 | 1274 |
| Example 16 | 97.5 | 80.4 | 1235 |
| Example 17 | 97.2 | 79.2 | 1292 |
| Comparative Example 2 | 96.8 | 77.4 | 1215 |

The lithium ion secondary battery including the negative electrode active material of the present invention is found to suitably maintain the capacity thereof. The negative electrode active material of the present invention is considered to relatively stably maintain the structure thereof even through charging and discharging accompanied by expansion and contraction. The negative electrode active material of the present invention is confirmed to have excellent strength.

The invention claimed is:

1. A negative electrode active material composed of a silicon material coated with a carbon layer containing a Group 4 to 6 metal,
   wherein the metal is contained in 1 mass % or less with respect to the negative electrode active material, or the metal is contained in 10 mole % or less with respect to a number of moles of carbon element present in the carbon layer.

2. The negative electrode active material according to claim 1, wherein
   the metal and carbon contained in the carbon layer are bound to each other.

3. The negative electrode active material according to claim 1, wherein
the silicon material has a structure made up of a plurality of plate-like silicon bodies laminated in a thickness direction.

4. The negative electrode active material according to claim 1, wherein
the metal is contained in 1 mass % or less with respect to the negative electrode active material, and the metal is contained in 10 mole % or less with respect to a number of moles of carbon element present in the carbon layer.

5. The negative electrode active material according to claim 1, wherein
in a Raman spectrum of the carbon layer, a value of (D-band peak intensity)/(G-band peak intensity) is within a range of 0.80 to 1.

6. A secondary battery comprising the negative electrode active material according to claim 1.

7. A method for producing the negative electrode active material according to claim 1, the method comprising
a step of decomposing a compound containing the Group 4 to 6 metal and a carbon source by heating in the presence of a silicon material, the compound, and the carbon source.

8. The method for producing the negative electrode active material according to claim 7, wherein
a temperature of the heating is within a range of 600 to 1000° C.

9. A method for producing a negative electrode, the method comprising
using a negative electrode active material produced by the method according to claim 7.

10. A method for producing a secondary battery, the method comprising
using a negative electrode produced by the method according to claim 9.

11. The method for producing the negative electrode active material according to claim 7, wherein the metal is selected from the group consisting of titanium potassium oxalate, tetrakis(ethylmethylamino)titanium, tetrakis(dimethylamino)titanium, tetramethoxytitanium, tetraethoxytitanium, tetra-n-propoxytitanium, tetraisopropoxytitanium, tetrabutoxytitanium, titanium tetrakis(2-ethyl-1-hexanolato), bis(cyclopentadienyl)dichlorotitanium, cyclopentadienyltribenzyltitanium, zirconium acetyl acetonato, tetramethoxyzirconium, tetraethoxyzirconium, tetra-n-propoxyzirconium, tetraisopropoxyzirconium, tetrabutoxyzirconium, tetrakis(ethylmethylamino)zirconium, tetrakis(dimethylamino)zirconium, dichlorobis(cyclopentadienyl)zirconium, bis(cyclopentadienyl)dimethylzirconium, methyltris(cyclopentadienyl)zirconium, bis(cyclopentadienyl)dibutylzirconium, bis(cyclopentadienyl)dichlorovanadium, vanadium (III) acetylacetonato, bis(cyclopentadienyl)niobium dichloride, tetrachloro(2,3,4,5-tetramethyl-2,4-cyclopentadienyl)niobium, niobium (V) pentaethoxide, penta-n-propoxyniobium (V), pentaisopropoxyniobium (V), pentabutoxyniobium (V), pentaphenoxyniobium (V), pentamethoxytantalum (V), pentaethoxytantalum (V), pentakis(dimethylamino)tantalum, tetrachloro(2,3,4,5-tetramethyl-2,4-cyclopentadienyl)tantalum, chromium (III) triacetate, chromium (III) acetylacetonato, hexacarbonylmolybdenum, molybdenum nitride, a dicarbonylcyclopentadienylmolybdenum dimer, a tricarbonylcyclopentadienylmolybdenum dimer, bipyridyltetracarbonylmolybdenum, molybdenum naphthenate, molybdenum octanoate, hexacarbonyltungsten, tungsten nitride, bis(isopropylcyclopentadienyl)tungsten (IV) dihydride, and bis(cyclopentadienyl)tungsten (IV) dihydride.

\* \* \* \* \*